United States Patent
Volny et al.

(10) Patent No.: US 11,021,256 B2
(45) Date of Patent: Jun. 1, 2021

(54) SEAT BACK HEAD RESTRAIN FOR PARACHUTE ASSEMBLIES

(71) Applicant: GOODRICH CORPORATION, Charlotte, NC (US)

(72) Inventors: Jaro S. Volny, Scottsdale, AZ (US); Kassidy L. Carson, Colorado Springs, CO (US); Scott R. Patterson, Manitou Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 376 days.

(21) Appl. No.: 16/138,336

(22) Filed: Sep. 21, 2018

(65) Prior Publication Data

US 2020/0094974 A1    Mar. 26, 2020

(51) Int. Cl.
*B64D 25/02* (2006.01)
*B64D 17/30* (2006.01)
*B64D 25/10* (2006.01)
*B64D 17/62* (2006.01)
*B64D 17/24* (2006.01)

(52) U.S. Cl.
CPC .............. *B64D 25/02* (2013.01); *B64D 17/24* (2013.01); *B64D 17/30* (2013.01); *B64D 17/62* (2013.01); *B64D 25/10* (2013.01)

(58) Field of Classification Search
CPC ........ B64D 25/02; B64D 25/10; B64D 25/04; B64D 17/30; B64D 2201/00
See application file for complete search history.

(56) References Cited

U.S. PATENT DOCUMENTS

| | | | |
|---|---|---|---|
| 1,640,270 A | 8/1927 | Furman | |
| 2,708,083 A * | 5/1955 | Martin | B64D 25/10 244/122 AE |
| 3,372,893 A | 3/1968 | Larsen | |
| 3,498,565 A | 3/1970 | Nash-Boulden Stephens | |
| 3,768,761 A | 10/1973 | Cramer | |
| 3,841,590 A | 10/1974 | Valentine | |
| 3,921,944 A | 11/1975 | Morrison | |
| 4,399,969 A | 8/1983 | Gargano | |
| 4,466,662 A | 8/1984 | McDonald | |

(Continued)

FOREIGN PATENT DOCUMENTS

| | | |
|---|---|---|
| DE | 4334743 | 10/1994 |
| FR | 2750395 | 10/1998 |

(Continued)

OTHER PUBLICATIONS

USPTO, Pre-Interview First Office Action dated Sep. 14, 2020 in U.S. Appl. No. 16/138,415.

(Continued)

*Primary Examiner* — Brian M O'Hara
(74) *Attorney, Agent, or Firm* — Snell & Wilmer L.L.P.

(57) ABSTRACT

A parachute assembly for an ejection seat may comprise a canopy and a first suspension line coupled to the canopy. A first riser may be coupled to the first suspension line. A seat cushion may be coupled to the first riser. The seat cushion may be configured detach from the ejection seat and restrict rearward translation of a head of an occupant of the ejection seat upon deployment of the parachute assembly.

16 Claims, 5 Drawing Sheets

(56) References Cited

U.S. PATENT DOCUMENTS

| | | | |
|---|---|---|---|
| 4,637,577 A * | 1/1987 | Miseyko | B64D 25/10 244/142 |
| 4,687,160 A | 8/1987 | Logemann | |
| 4,850,554 A | 7/1989 | Strong | |
| 4,923,147 A | 5/1990 | Adams et al. | |
| 5,039,035 A | 8/1991 | Fitzpatrick | |
| 5,301,903 A | 4/1994 | Aronne | |
| 6,708,927 B2 | 3/2004 | Chen | |
| 7,703,152 B2 | 4/2010 | Rhodes et al. | |
| 9,038,948 B2 | 5/2015 | Ruff et al. | |
| 9,924,755 B2 | 3/2018 | Margetis | |
| 2004/0182644 A1 | 9/2004 | Kotarski | |
| 2012/0012421 A1 | 1/2012 | Morgan | |
| 2013/0092796 A1 | 4/2013 | Weinel | |
| 2017/0106987 A1 * | 4/2017 | Adams | B64D 25/10 |
| 2017/0349292 A1 | 12/2017 | Adams et al. | |
| 2020/0094972 A1 | 3/2020 | Volney et al. | |
| 2020/0094973 A1 | 3/2020 | Volney et al. | |
| 2020/0094974 A1 | 3/2020 | Volney et al. | |
| 2020/0094975 A1 | 3/2020 | Volney et al. | |

FOREIGN PATENT DOCUMENTS

| | | |
|---|---|---|
| RU | 2621133 | 5/2017 |
| RU | 2624122 | 6/2017 |

OTHER PUBLICATIONS

USPTO, Pre-Interview First Office Action dated Oct. 30, 2020 in U.S. Appl. No. 16/138,014.

USPTO, Notice of Allowance dated Nov. 12, 2020 in U.S. Appl. No. 16/138,415.

USPTO, Pre-Interview First Office Action dated Dec. 22, 2020 in U.S. Appl. No. 16/138,216.

* cited by examiner

SEAT BACK HEAD RESTRAIN FOR PARACHUTE ASSEMBLIES

FIELD

The present disclosure relates to parachute assemblies, and more specifically, to parachute assemblies having a seat back head restraint.

BACKGROUND

Ejection seats are designed to eject pilots from an aircraft, with the pilot oriented in a generally upright, sitting position. Conventionally, the pilot is released from the ejection seat in response to a main canopy of the ejection seat's parachute assembly deploying. As the canopy catches wind, the pilot may be rotated to orient the pilot in the direction of canopy line stretch. As the pilot is rotated in-line with the force provided by the canopy, there is an increased risk of neck hyperextension and injury due to the change in angular momentum forcing the pilot's head rearward.

SUMMARY

Disclosed herein is a parachute assembly for an ejection seat. In accordance with various embodiments, the parachute assembly may comprise a canopy, a first suspension line coupled to the canopy, a first riser coupled to the first suspension line. and a seat cushion head restraint coupled to the first riser. The seat cushion head restraint may be detachably coupled to a back support section of the ejection seat.

In various embodiments, the first riser may be coupled to a rearward surface of the seat cushion head restraint. In various embodiments, the seat cushion head restraint may be configured to rotate 180° upon deployment of the parachute assembly.

In various embodiments, a distal portion of the first riser may be coupled to a first portion of the seat cushion head restraint, and a proximal portion of the first riser may be coupled to a second portion of the seat cushion head restraint different from the first portion.

In various embodiments, the parachute assembly may further comprise a second suspension line coupled to the canopy, and a second riser coupled to the second suspension line. The seat cushion head restraint may be coupled to the second riser.

In various embodiments, the first riser may comprise a first left shoulder riser and the second riser may comprise a first right shoulder riser. The parachute assembly may further comprise a second left shoulder riser located forward of the first left shoulder riser, and a second right shoulder riser located forward of the first right shoulder riser.

In various embodiments, the seat cushion head restraint may be configured to restrict rearward translation of a head of an occupant of the ejection seat upon deployment of the parachute assembly.

Also disclosed herein is an ejection system. In accordance with various embodiments, the ejection system may comprise an ejection seat, a seat cushion head restraint coupled to a seatback portion of the ejection seat, a first riser coupled to the seat cushion head restraint, and a first suspension line coupled to the first riser.

In various embodiments, the first riser may be coupled to a rearward surface of the seat cushion head restraint. In various embodiments, the ejection system may further comprise a canopy coupled to the first suspension line. The seat cushion head restraint may be configured to rotate 180° upon a deployment of the canopy.

In various embodiments, a distal portion of the first riser may be coupled to a first portion of the seat cushion head restraint, and a proximal portion of the first riser may be coupled to a second portion of the seat cushion head restraint different from the first portion. In various embodiments, the seat cushion head restraint may be configured such that prior to the deployment of the canopy the first portion of the seat cushion head restraint is located closer to a seat pan of the ejection seat as compared to the second portion of the seat cushion head restraint, and after the deployment of the canopy the first portion of the seat cushion head restraint is located closer to the first suspension line as compared to the second portion of the seat cushion head restraint.

In various embodiments, the ejection system may further comprise a second riser coupled to the seat cushion head restraint. In various embodiments, the ejection system may further comprise a canopy configured to deploy from the ejection seat, and a reefing line configured to restrict an expansion of the canopy. The first suspension line may be coupled to the reefing line.

In various embodiments, the seat cushion head restraint may be configured to translate away from the canopy in response to the reefing line being severed.

As disclosed herein, and in accordance with various embodiments, a parachute assembly may comprise a first riser configured to attach to a first suspension line, a second riser configured to attach to a second suspension line, and a seat cushion head restraint coupled to the first riser and the second riser.

In various embodiments, the first riser and the second riser may be coupled to a rearward surface of the seat cushion head restraint. In various embodiments, the seat cushion head restraint may be configured to rotate 180° upon deployment of the parachute assembly.

In various embodiments, the seat cushion head restraint may be configured to restrict rearward translation of a head of an occupant of the parachute assembly. In various embodiments, the seat cushion head restraint is configured to translate from rearward of an upper thoracic area of the occupant to rearward of the head of the occupant upon deployment of the parachute assembly.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
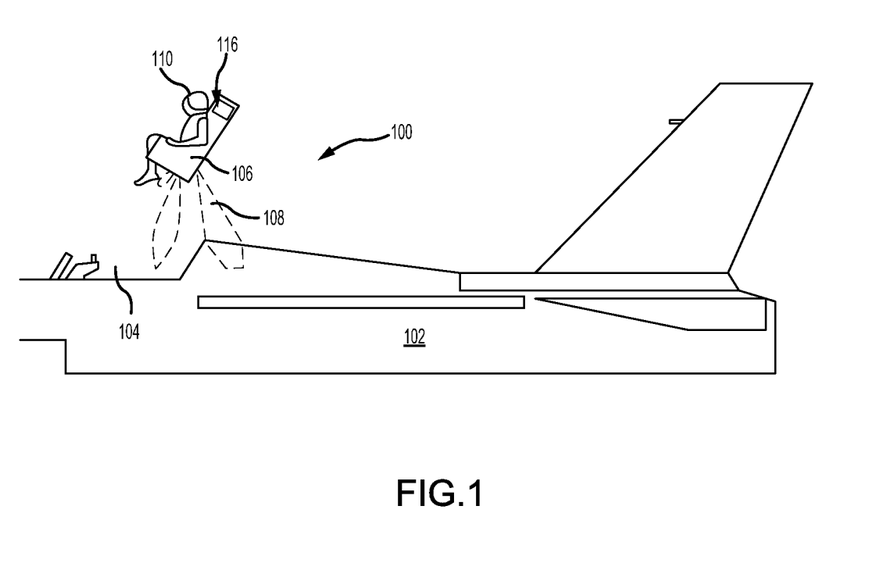
FIG. 1 illustrates an ejection seat being launched from an aircraft cockpit, in accordance with various embodiments.

In various embodiments, and with reference to FIG. 1, an aircraft ejection system 100 is shown, in accordance with various embodiments. Aircraft ejection system 100 may be installed in an aircraft 102 to safely expel an ejection seat 106 and an occupant 110 of ejection seat 106 from a cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, at least a portion of parachute assembly 116 may be stored within ejection seat 106.

Figure 2:
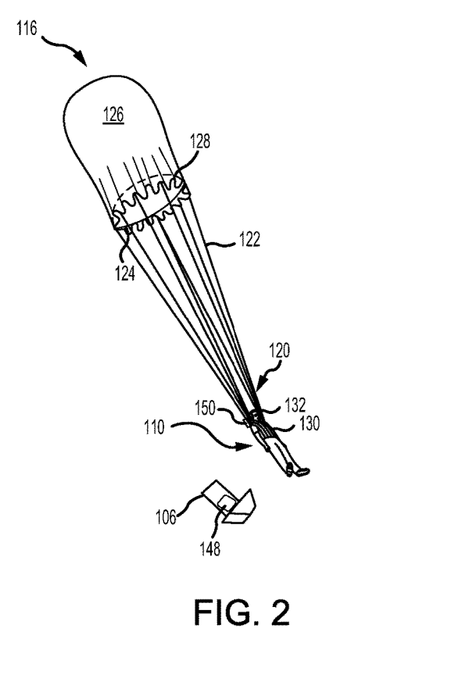
FIG. 2 illustrates a perspective view of a parachute assembly in a deployed state after separation of the ejection seat, in accordance with various embodiments.

With reference to FIG. 2, parachute assembly 116 is illustrated in a deployed state, in accordance with various embodiments. Parachute assembly 116 may be used to increase a drag of, or otherwise decelerate, occupant 110. Parachute assembly may be deployed in response to occupant 110 being ejected, jumped, ditched, and/or dropped (collectively, "ejected") from an aircraft. Parachute assembly 116 may be configured to deploy upon separation of occupant 110 from ejection seat 106. Stated differently, in various embodiments, deployment of parachute assembly 116 may be configured to separate occupant 110 from ejection seat 106. Parachute assembly 116 may comprise a canopy 126, suspension lines 122, and risers 120.

Upon deployment of parachute assembly 116, canopy 126 may open to increase drag, or otherwise decelerate, occupant 110. Canopy 126 may comprise any suitable type of canopy and any suitable type of material, such as, for example, canvas, silk, nylon, aramid fiber (e.g., KEVLAR®), polyethylene terephthalate, and/or the like. Suspension lines 122 may be coupled to canopy 126 using any suitable attachment technique, such as, for example, through stitching. Suspension lines 122 may be configured to at least partially stabilize deployed canopy 126.

In various embodiments, suspension lines 122 may be configured to connect canopy 126 to risers 120. Suspension lines 122 and risers 120 may comprise any suitable material. For example, suspension lines 122 may comprise a tubular braided material that constricts in diameter under tension, such as, for example, nylon, aramid fiber (e.g., KEVLAR®), and/or the like. Risers 120 may comprise a webbing formed from nylon, aramid fiber (e.g., KEVLAR®), and/or the like. Risers 120 may be configured to attach to a harness 130, or other structure, configured to secure occupant 110 to risers 120. In various embodiments, parachute assembly 116 may comprise a plurality of risers 120 attached to harness 130.

Figure 3:
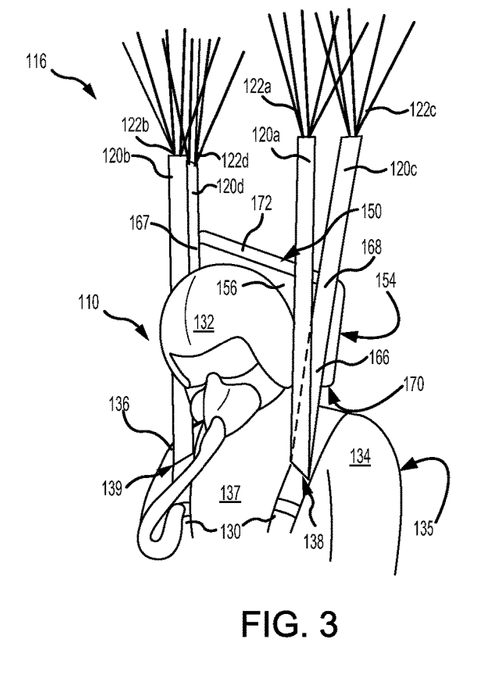
FIG. 3 illustrates a perspective view of a parachute assembly in a deployed state with a seat cushion head restraint located behind the head of the parachute assembly occupant, in accordance with various embodiments.

With reference to FIG. 3, in various embodiments, parachute assembly 116 may comprise left shoulder (or first) risers 120a and 120c, and right shoulder (or second) risers 120b and 120d. Left shoulder risers 120a and 120c are attached proximate a left shoulder 134 of occupant 110 and/or are configured to be located over left shoulder 134 of occupant 110 upon deployment of parachute assembly 116. Right shoulder risers 120b and 120d are attached proximate a right shoulder 136 of occupant 110 and/or are configured to be located over right shoulder 136 of occupant 110 upon deployment of parachute assembly 116.

In various embodiments, left shoulder riser 120c is located rearward of left shoulder riser 120c, and right shoulder riser 120b is located forward of right shoulder riser 120d. Stated differently, left shoulder riser 120c and right shoulder riser 120d may be located closer to a backside 135 of occupant 110 as compared, respectively, to left shoulder riser 120a and right shoulder riser 120b. As used herein, "forward" refers to the side of harness 130 configured to be attached to a front side of an occupant. Backside 135 of occupant 110 is generally opposite a front side 137 of occupant 110.

In various embodiments, left shoulder risers 120a and 120c may be attached to harness 130 at an attachment location 138, and right shoulder risers 120b and 120d may be attached to harness 130 at an attachment location 139. Attachment locations 138, 139 are on an end of risers 120 that is opposite suspension lines 122, with momentary reference to FIG. 2. Attachment locations 138, 139 may comprise any suitable attachment mechanism (e.g., stitching, adhesive, etc.) for securing risers 120 to harness 130. In various embodiments, attachment locations 138, 139 may each comprise a hoop, or ring, attached to harness 130 and located through a loop formed by risers 120. In various embodiments, each riser 120 (e.g., left shoulder riser 120a, right shoulder riser 120b, left shoulder riser 120c, right shoulder riser 120d) may have its own attachment location on harness 130.

In various embodiments, parachute assembly 116 may comprise a greater number of suspension lines 122 as compared to the number of risers 120. For example, each riser 120 may couple to multiple suspension lines 122, such as, for example 1 to 16 suspension lines 122 per riser 120, 8 to 16 suspension lines 122 per riser 120, etc. In this regard, left shoulder riser 120a may be coupled to a first set 122a of suspension lines 122, right shoulder riser 120b may be coupled to a second set 122b of suspension lines 122, left shoulder riser 120c may be coupled to a third set 122c of suspension lines 122, and right shoulder riser 120d may each couple to a fourth set 122d of suspension lines 122.

With combined reference to FIG. 2 and FIG. 3, as canopy 126 catches wind, occupant 110 may be rotated in-line with the direction of suspension line stretch. As occupant 110 is rotated, a rearward force may be exerted on the neck of occupant 110. As used herein, "rearward" refers to the side of harness 130 configured to be attached to a backside of an occupant supported by parachute assembly 116. In accordance with various embodiments, parachute assembly 116 may include a seat cushion head restraint 150. Seat cushion head restraint 150 is configured to be located rearward of the head 132 of occupant 110, upon deployment of parachute assembly 116. Seat cushion head restraint 150 is configured to limit translation of head 132 in the rearward direction, thereby reducing a likelihood of head and/or neck injury to occupant 110. In various embodiments, seat cushion head restraint 150 comprises a seat cushion which, prior to deployment of parachute assembly 116, may be attached to ejection seat 106.

Figure 4A:
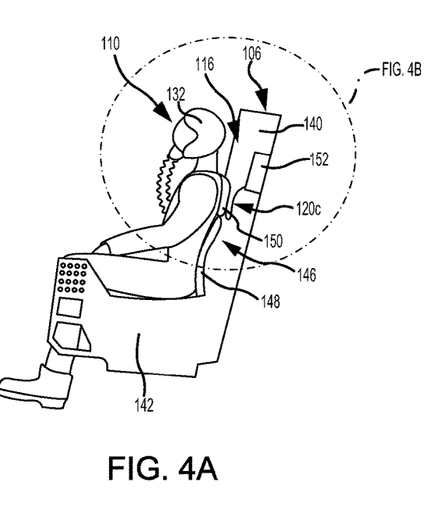
FIGS. 4A and 4B illustrate a side view of an ejection seat prior to deployment of a parachute assembly, in accordance with various embodiments.
Figure 4B:
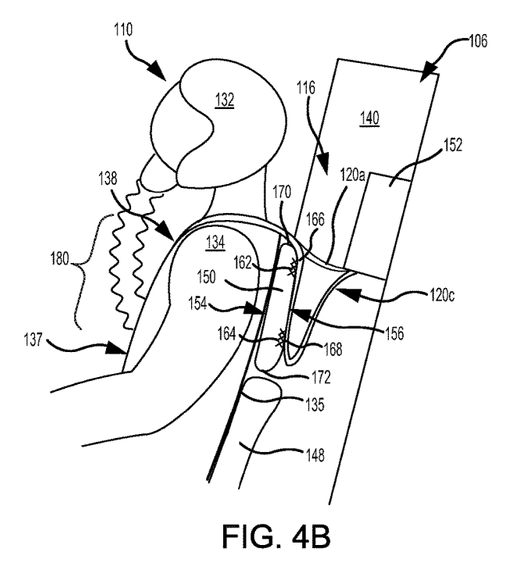

FIGS. 4A and 4B illustrate a side view of occupant 110 seated in ejection seat 106, prior to deployment of parachute assembly 116, in accordance with various embodiments. Prior to deployment of parachute assembly 116, seat cushion head restraint 150 may form a portion of a seat cushion 146 of ejection seat 106. In various embodiments, seat cushion 146 may include seat cushion head restraint 150 and a second cushion 148. Seat cushion head restraint 150 and second cushion 148 may each be located proximate a seatback portion 140 of ejection seat 106. Seatback portion 140 may extend generally orthogonally from a seat pan portion 142 of ejection seat 106. Second cushion 148 is coupled to seatback portion 140 and may be located proximate (i.e., closer) to seat pan portion 142, as compared to seat cushion head restraint 150. Seat cushion head restraint 150 is detachably coupled to seatback portion 106. For example, seat cushion head restraint 150 may be detachably coupled to seatback portion 106 using snaps, hook and loops fasteners (e.g., VELCRO), or any other suitable coupling configured to allow seat cushion head restraint 150 to detach from seatback portion 140, upon deployment of parachute assembly 116. Prior to deployment of parachute assembly 116, seat cushion head restraint 150 and second cushion 148 may be located between occupant 110 and seatback portion 140.

A parachute container 152 may be located on, or within, seatback portion 140. In various embodiments and with momentary combined reference to FIGS. 2 and 4A, prior to deployment of parachute assembly 116, parachute container 152 may house canopy 126, suspension lines 122, and at least a portion of risers 120. After deployment of parachute assembly 116, second cushion 148 may remain attached to ejection seat 106, and seat cushion head restraint 150 may separate from ejection seat 106 and locate rearward of head 132 of occupant 110.

Figure 4C:
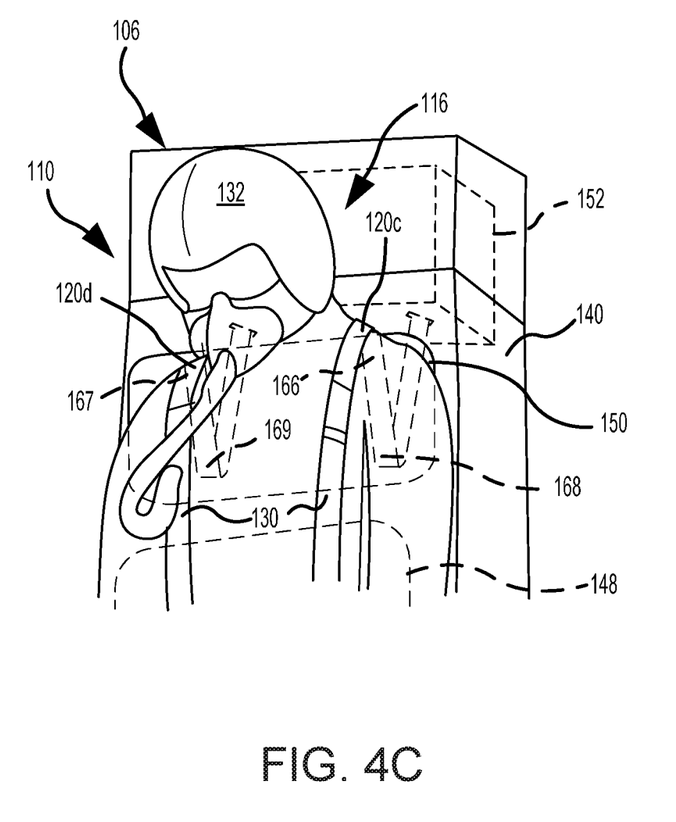
FIG. 4C illustrates a perspective view an ejection seat prior to deployment of a parachute assembly, in accordance with various embodiments.

FIG. 4C illustrates a perspective rearward view of occupant 110 seated in ejection seat 106, prior to deployment of parachute assembly 116, in accordance with various embodiments. Left shoulder riser 120a and right shoulder riser 120b have been omitted from FIG. 4C for clarity. In various embodiments, seat cushion head restraint 150 may be coupled to left shoulder riser 120c and to right shoulder riser 120d. Seat cushion head restraint 150 may be coupled to left shoulder riser 120c and right shoulder riser 120d using any suitable attachment technique, such as, for example, through stitching, adhesive, friction coupling, etc. With combined reference to FIG. 4B and FIG. 4C, left and right shoulder risers 120c, 120d may be coupled to a rearward surface 156 of seat cushion head restraint 150. Rearward surface 156 is oriented toward seatback portion 140 and away from occupant 110, prior to deployment of parachute assembly 116. Rearward surface 156 is opposite a forward surface 154 of seat cushion head restraint 150. Forward surface 154 is oriented toward occupant 110 and away from seatback portion 140, prior to deployment of parachute assembly 116.

In various embodiments, a distal portion 166 of left shoulder riser 120c may be coupled to a first portion 162 of rearward surface 156 that is proximate a first end 170 of seat cushion head restraint 150, and a proximal portion 168 of left shoulder riser 120c may be coupled to second portion 164 of rearward surface 156 that is proximate a second end 172 of seat cushion head restraint 150. In the deployed state, distal portion 166 is located a greater distance from suspension lined 122c, with momentary reference to FIG. 3, as compared to proximal portion 168. A distal portion 167 of right shoulder riser 120d may be coupled to rearward surface 156 proximate first end 170 of seat cushion head restraint 150, and a proximal portion 169 of right shoulder riser 120d may be coupled to rearward surface 156 proximate second end 172 of seat cushion head restraint 150. In the deployed state, distal portion 167 is located a greater distance from suspension lines 122d, with momentary reference to FIG. 3, as compared to proximal portion 169. Prior to deployment of parachute assembly 116, second end 172 of seat cushion head restraint 150 is located more proximate (i.e., closer to) second cushion 148 as compared to first end 170 of seat cushion head restraint 150.

In various embodiments, prior to deployment of parachute assembly 116, seat cushion head restraint 150 may be located proximate an upper thoracic area 180 of occupant 110. Stated differently, prior to deployment of parachute assembly 116, seat cushion head restraint 150 may be located below, or not directly rearward of, head 132. In various embodiments, left and right shoulder risers 120c, 120d are configured translate seat cushion head restraint 150 from rearward of upper thoracic area 190 to rearward of head 132, upon deployment of parachute assembly 116. In various embodiments, left and right shoulder risers 120c, 120d are coupled to seat cushion head restraint 150 such that, upon deployment of parachute assembly 116, head restraint will rotate 180°.

With reference to FIG. 3, an orientation of seat cushion head restraint 150, after deployment of parachute assembly 116, is illustrated, in accordance with various embodiments. Seat cushion head restraint 150 may be directly rearward and/or in contact with head 132. Rearward surface 156 of seat cushion head restraint 150 may be oriented toward head 132. Forward surface 154 may be oriented away from head 132. First end 170 may be oriented away from suspension lines 122, and second end 172 may be oriented toward suspension lines 122. Locating seat cushion head restraint 150 behind head 132 may limit rearward motion of head 132 during peak deployment forces to reduce possibility of neck hyperextension of occupant 110.

Figure 5A:
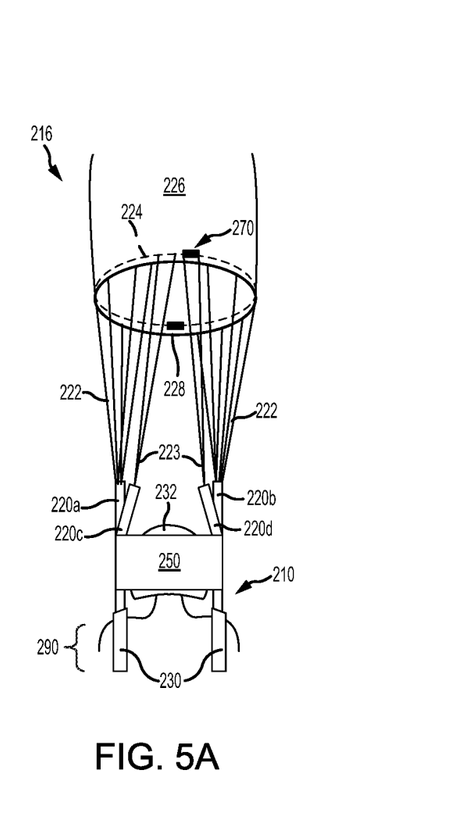
FIG. 5A illustrates a perspective view of a parachute assembly in a deployed state with a seat cushion head restraint coupled to a reefing line, in accordance with various embodiments.

With reference to FIG. 5A, a parachute assembly 216 having a seat cushion head restraint coupled to a reefing line is illustrated, in accordance with various embodiments. Parachute assembly 216 is similar to parachute assembly 116 and may replace parachute assembly 116 in aircraft ejection system 100, with momentary reference to FIG. 1. Parachute assembly 216 includes a canopy 226, suspension lines 222, left shoulder risers 220a, 220c, and right shoulder risers 220b, 220d. Left shoulder risers 220a, 220c, and right shoulder risers 220b, 220d may be coupled to a harness 230 configured to be worn by or otherwise secured to an occupant 210 of parachute assembly 216.

Parachute assembly 216 includes a head restraint 250. Head restraint 250 is similar to seat cushion head restraint 150 in FIG. 4B. In accordance with various embodiments, head restraint 250 comprises a seat cushion that is configure to separate from an ejection seat, upon deployment of parachute assembly 216. Head restraint 250 may be coupled to left and right shoulder risers 220c, 220d. Left and right shoulder risers 220c, 220d may be configured to translate head restraint 250 from rearward of upper thoracic area 290 to rearward of head 232, upon deployment of parachute assembly 216. In various embodiments, left and right shoulder risers 220c, 220d may be configured to rotate head restraint 250 180° in response to deployment of parachute assembly 216.

In various embodiments, parachute assembly 216 may include one or more reefing line(s) 224. Reefing line 224 may be coupled to canopy 226 proximate a circumferential edge 228 of canopy 226. Reefing line 224 is configured to restrict expansion of canopy 226, such that canopy 226 opens in stages. For example, parachute assembly 216 may include a cutter 270 configured to cut, or otherwise sever, reefing line 224 a preselected time after deployment of canopy 226. Prior to cutting reefing line 224, canopy 226 is held at a first, restricted diameter; after reefing line 224 is severed, canopy 226 is able to open further and its diameter increases. Opening canopy 226 in stages may reduce opening shock to parachute assembly 216 and occupant 210. The time delay between deploying canopy 226 and severing reefing line 224 may comprise any suitable time delay based on properties of parachute assembly 216, the type of aircraft, and/or the load limitations of the object (e.g., occupant 210) being supported by parachute assembly 216.

Parachute assembly 216 may comprise one or more suspension lines 223 coupled to reefing line 224. In various embodiments, suspension lines 222, which are coupled to canopy 226, may be attached to left shoulder riser 220c and right shoulder riser 220d, and suspension lines 223, which are coupled to reefing line 224, may be attached to left shoulder riser 220c and right shoulder riser 220d.

Figure 5B:
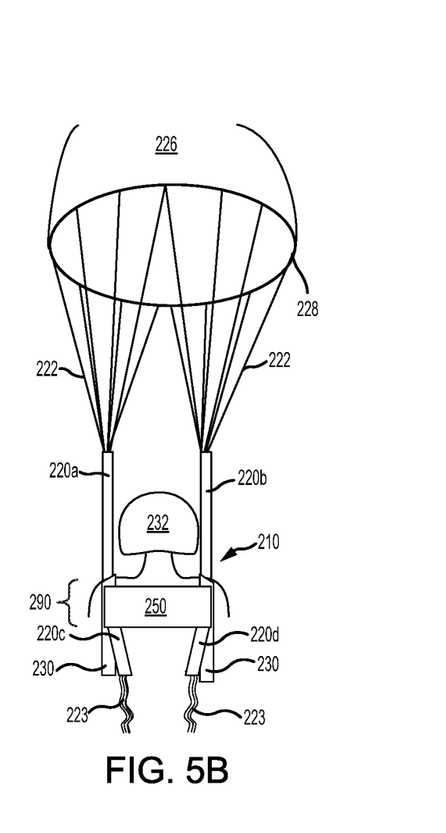
FIG. 5B illustrates a perspective view of the parachute assembly of FIG. 5B after severing a reefing line, in accordance with various embodiments.

FIG. 5B illustrates parachute assembly 216 with canopy 226 after a severing of reefing line 224. Suspension lines 223 may be coupled to reefing line 224 such that severing reefing line 224 releases suspension lines 223 from canopy 226. The released suspension lines 223, along with left and right shoulder risers 220c, 220d and head restraint 250, are pulled by gravitational forces toward the ground, thereby removing head restraint 250 from behind head 232. Removing head restraint 250 from head 232 may increase a range of motion of head 232 and/or may allow head 232 to be oriented at a more comfortable angle. Parachute assembly 216 having head restraint 250 coupled to reefing line 224 may limit rearward translation of head 232 during peak deployment forces to reduce possibility of neck injury, while providing occupant 210 with increased head mobility and range of vision during steady state decent and landing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parachute assembly for an ejection seat, comprising:
   a canopy;
   a first suspension line coupled to the canopy;
   a first riser coupled to the first suspension line; and
   a seat cushion head restraint coupled to the first riser and configured to limit reward head movement during deployment of the parachute assembly, wherein the first riser is coupled to a rearward surface of the seat cushion head restraint, and wherein the first riser being coupled to the rearward surface of the seat cushion head restraint causes the seat cushion head restraint to rotate 180° upon deployment of the parachute assembly.

2. The parachute assembly of claim 1, wherein a distal portion of the first riser is coupled to a first portion of the rearward surface of the seat cushion head restraint, and wherein a proximal portion of the first riser is coupled to a second portion of the rearward surface of the seat cushion head restraint different from the first portion, the distal portion of the of the first riser be a greater distance, as measured along the first riser and the first suspension line, from the canopy as compared to the proximal portion of the first riser, and wherein the second portion of the rearward surface of the seat cushion head restraint is located closer to a seat pan of the ejection seat as compared to the first portion of the rearward surface of the seat cushion head restraint.

3. The parachute assembly of claim 1, further comprising:
 a second suspension line coupled to the canopy; and
 a second riser coupled to the second suspension line, wherein the seat cushion head restraint is coupled to the second riser.

4. The parachute assembly of claim 3, wherein the first riser comprises a first left shoulder riser and the second riser comprises a first right shoulder riser, and wherein the parachute assembly further comprises:
 a second left shoulder riser located forward of the first left shoulder riser; and
 a second right shoulder riser located forward of the first right shoulder riser.

5. The parachute assembly of claim 1, further comprising a reefing line configured to restrict an expansion of the canopy, wherein the first suspension line is coupled to the reefing line.

6. An ejection system, comprising:
 an ejection seat including a seat pan and a seatback portion;
 a seat cushion located on the seatback portion of the ejection seat, the seat cushion including a seat cushion head restraint and a second cushion, the second cushion being located between the seat cushion head restraint and the seat pan, wherein the seat cushion head restraint is detachably coupled to the seatback portion of of the ejection seat;
 a parachute assembly located on the ejection seat, the parachute assembly comprising:
  a first riser coupled to the seat cushion head restraint;
  a first suspension line coupled to the first riser; and
  a canopy coupled to the first suspicion line, wherein a distal portion of the first riser is coupled to a first portion of the seat cushion head restraint, and wherein a proximal portion of the first riser is coupled to a second portion of the seat cushion head restraint different from the first portion, the distal portion of the of the first riser is a greater distance, as measured along the first riser and the first suspension line, from the canopy as compared to the proximal portion of the first riser, and wherein, prior to deployment of the parachute assembly, the second portion of the seat cushion head restraint is located closer to the seat pan of the ejection seat as compared to the first portion of the seat cushion head restraint, wherein the seat cushion head restraint limits reward head movement during deployment of the parachute assembly.

7. The ejection system of claim 6, wherein the first riser is coupled to a rearward surface of the seat cushion head restraint, the rearward surface including the first portion and the second portion of the seat cushion head restraint.

8. The ejection system of claim 7, wherein the seat cushion head restraint is configured to rotate 180° in response to deployment of the canopy.

9. The ejection system of claim 6, wherein after the deployment of the canopy the second portion of the seat cushion head restraint is located closer to the canopy as compared to the first portion of the seat cushion head restraint.

10. The ejection system of claim 6, wherein the parachute assembly further comprises a second riser coupled to the seat cushion head restraint.

11. The ejection system of claim 6, wherein the parachute assembly further comprises:
 a reefing line configured to restrict an expansion of the canopy, wherein the first suspension line is coupled to the reefing line.

12. The ejection system of claim 11, wherein the seat cushion head restraint is configured to translate away from the canopy in response to the reefing line being severed.

13. A parachute assembly, comprising:
 a canopy;
 a first riser coupled to the canopy;
 a second riser coupled to the canopy;
 a seat cushion head restraint coupled to the first riser and the second riser; and
 a reefing line configured to restrict an expansion of the canopy, wherein at least one of the first riser or the second riser is coupled to the reefing line such that the at least one of the first riser or the second riser decouples from the canopy in response to a severing of the reefing line.

14. The parachute assembly of claim 13, wherein the first riser and the second riser are coupled to a rearward surface of the seat cushion head restraint.

15. The parachute assembly of claim 14, wherein the seat cushion head restraint is configured to rotate 180° upon deployment of the parachute assembly.

16. The parachute assembly of claim 13, further comprising:
 a plurality of first suspension lines coupling the first riser to the canopy; and
 a plurality of second suspension lines coupling the second riser to the canopy.

* * * * *